United States Patent [19]
Park et al.

[11] Patent Number: 6,094,438
[45] Date of Patent: Jul. 25, 2000

[54] PARITY DETECTION DEVICE AND METHOD IN CDMA MOBILE COMMUNICATIONS SYSTEM

[75] Inventors: Jin-Young Park, Seoul; Hong-Koo Kang, Kyoungki-do, both of Rep. of Korea

[73] Assignee: Hyundai Electronics Ind. Co., Ltd., Kyoungki-do, Rep. of Korea

[21] Appl. No.: 08/950,221

[22] Filed: Oct. 14, 1997

[30] Foreign Application Priority Data

Oct. 14, 1996 [KR] Rep. of Korea ............... 96-45678

[51] Int. Cl.[7] ........................................... H04B 1/69
[52] U.S. Cl. ................................. 370/441; 371/49.2
[58] Field of Search .................... 370/335, 441; 371/61, 49.2, 37.1, 3 R, 31, 20.1

[56] References Cited

U.S. PATENT DOCUMENTS

| | | |
|---|---|---|
| 4,413,340 | 11/1983 | Odaka et al. . |
| 4,796,292 | 1/1989 | Thomas . |
| 4,841,527 | 6/1989 | Raychaudhuri et al. ............... 714/748 |
| 5,020,077 | 5/1991 | Rhodes ..................... 375/222 |
| 5,309,449 | 5/1994 | Gandini et al. .......................... 714/781 |
| 5,412,670 | 5/1995 | Stork et al. . |
| 5,459,741 | 10/1995 | Iwamura . |
| 5,513,191 | 4/1996 | Takechi et al. .......................... 714/752 |
| 5,528,599 | 6/1996 | Rodriguez et al. ..................... 714/712 |
| 5,600,754 | 2/1997 | Gardner et al. .......................... 704/221 |
| 5,602,832 | 2/1997 | Hudson . |
| 5,606,552 | 2/1997 | Baldwin et al. . |
| 5,724,385 | 3/1998 | Levin et al. ............................. 375/222 |
| 5,793,841 | 8/1998 | Jung et al. ............................... 714/800 |
| 5,867,041 | 2/1999 | Ha ............................................. 327/20 |

*Primary Examiner*—Hassan Kizou
*Assistant Examiner*—Ahmed Ellallam
*Attorney, Agent, or Firm*—McAulay Nissen Godlberg & Kiel, LLP

[57] ABSTRACT

The present invention discloses a parity detection device and method in a CDMA mobile communications system, which detects parity error in data output from a cell site modem (Q51601-2S1), and controls the data output when the parity error occurs, to improve the reliability in data communication. The invention converts serial data to be transmitted through a CSM into parallel data, checks if there is a parity error in the parallel data, and generates an interrupt when a parity error is detected. When the interrupt is generated, an output controller restrains the transmission of the serial data to be transmitted, which is outputted from the CSM, thereby preventing data having error from being transmitted.

4 Claims, 7 Drawing Sheets

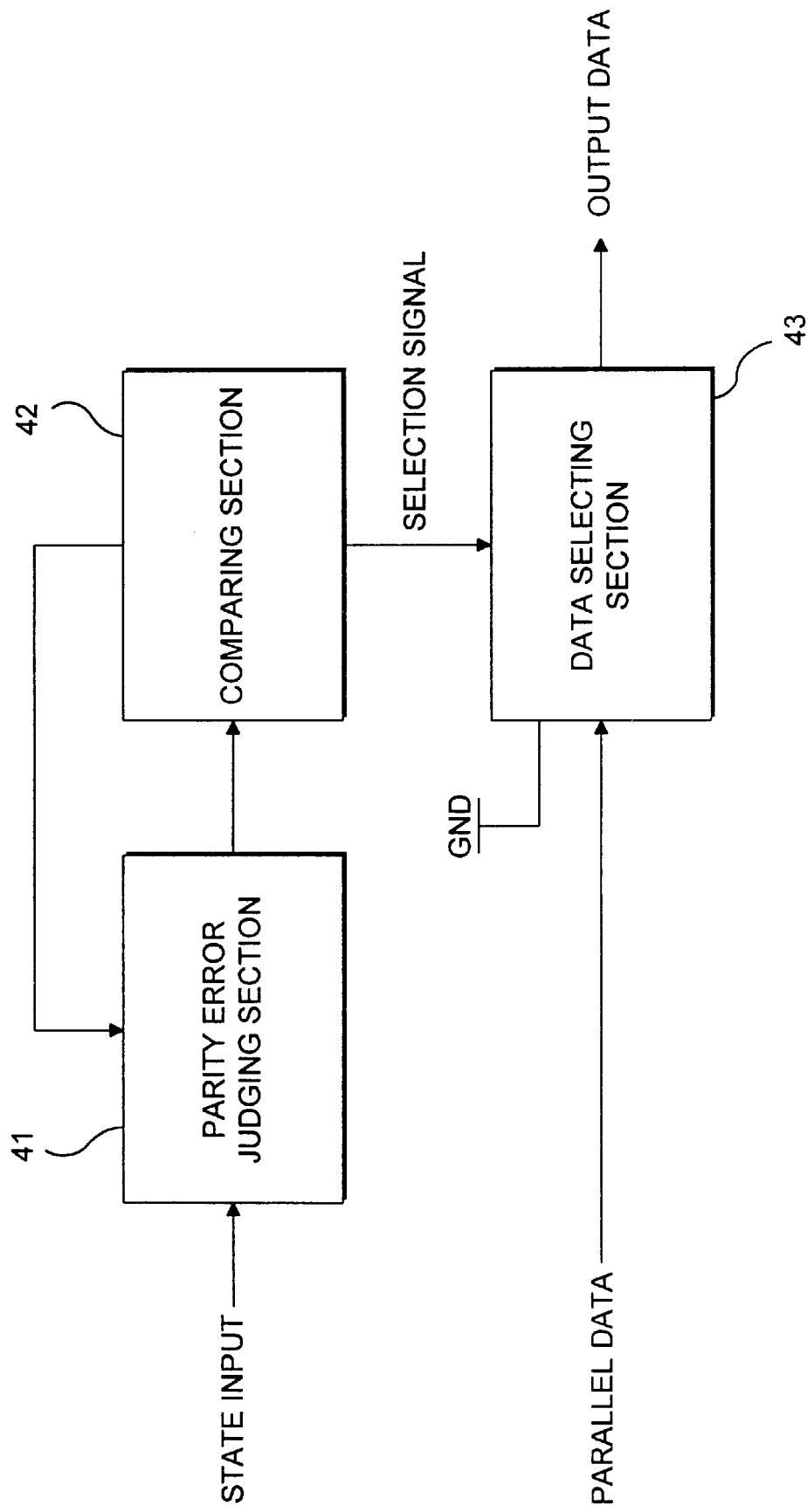
F I G. 5

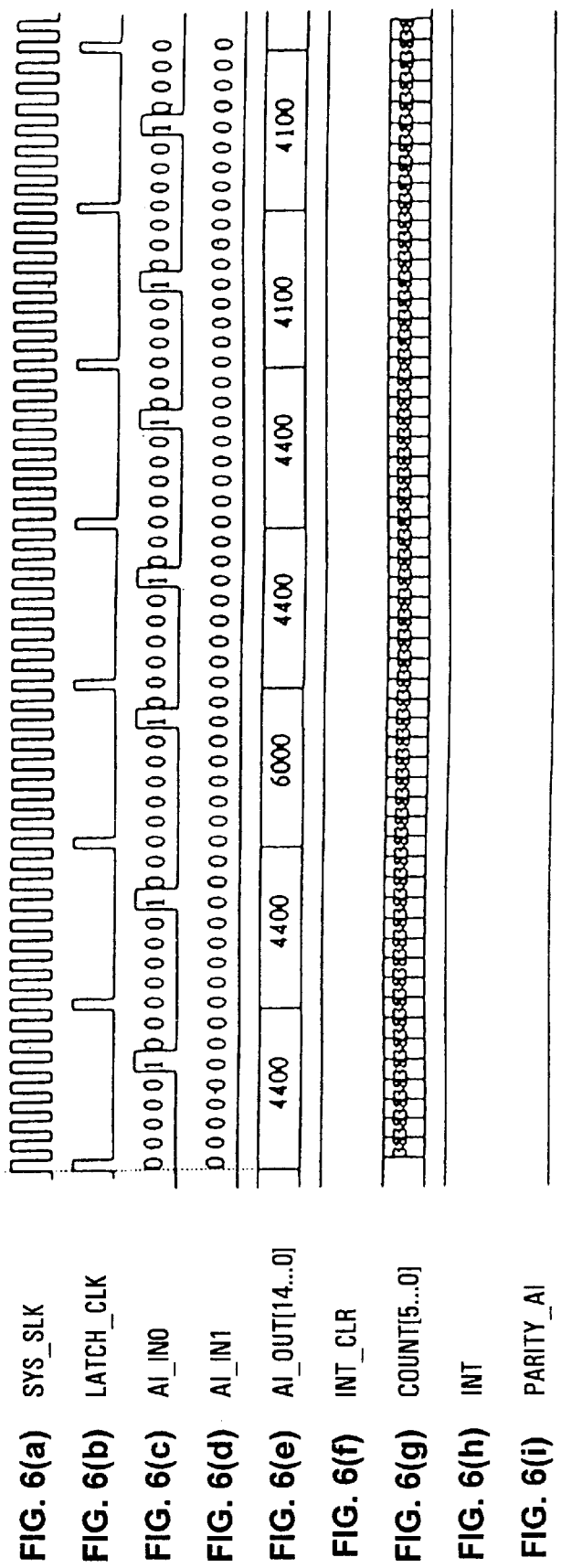

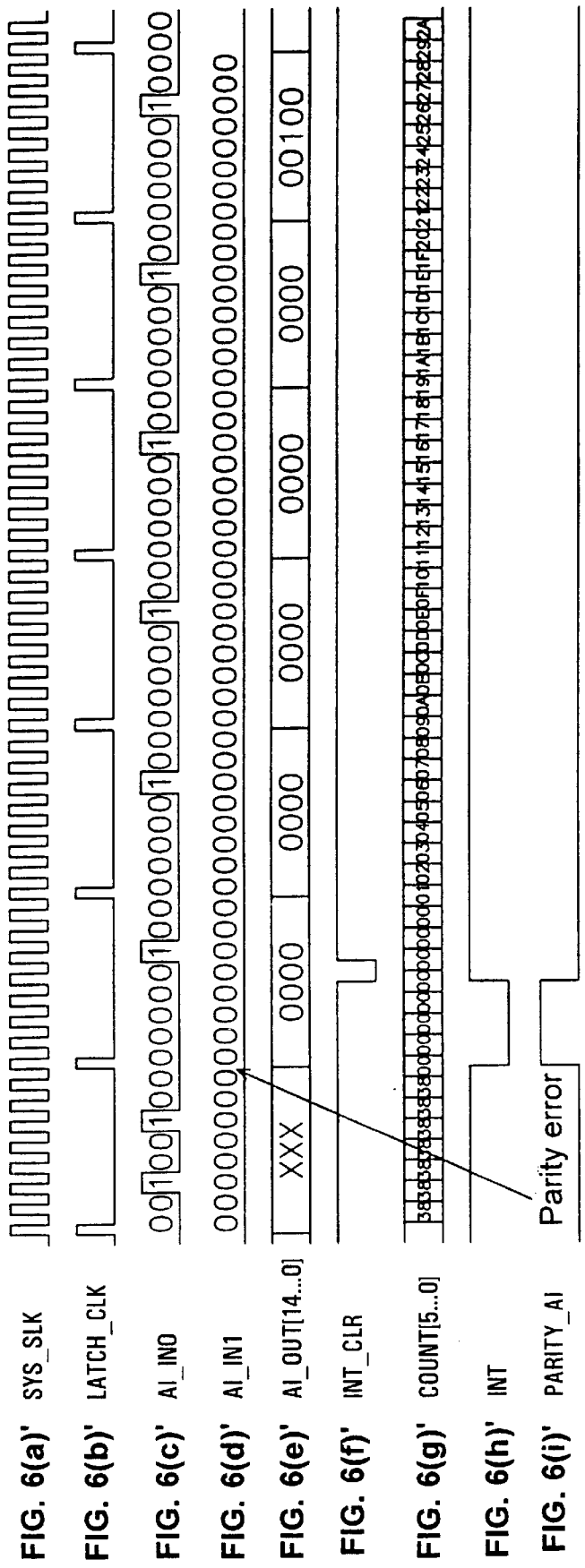

PARITY DETECTION DEVICE AND METHOD IN CDMA MOBILE COMMUNICATIONS SYSTEM

BACKGROUND OF THE INVENTION

1. Field of the Invention

The present invention relates to parity detection in a CDMA mobile communications system, specifically, to a parity detection device and method in a CDMA mobile communications system, which detects parity error in data output from a cell site modem (Q51601-2S1), and controls the data output when the parity error occurs, to improve the reliability in data communication.

2. Discussion of Related Art

In a CDMA mobile communications system, which conforms to a protocol defined in calling process of Electronic Industrial Association, a mobile, which is in the initial state with the power application, searches the control channel of a base station (cell site) which sends the highest intensity of signal, that is, the nearest base station at the location where the mobile is currently placed. When the mobile searches the nearest control channel, it goes to hook-on mode, and receives a message that the current base station transmits through a selected channel. The base station performs communications about the entire mobile communications through a communication message, which is transmitted/received between the base station and mobile, or base station and control unit, other than the aforementioned message. Here, a cell cite modem (CSM) is used. That is, data is transmitted and received through the CSM in the data communications between the base station and mobile, or base station and control unit.

FIG. 1 shows the configuration of the CSM. Referring to FIG. 1, the modem includes a base station modulation section 1 having a plurality of modulators 1a to 1d which modulate four channels of data to be transmitted, and first, second and third data combining sections 2, 3 and 4 for combining the channel data modulated by each of modulators 1a to 1d of base station modulation unit 1 by alpha, beta and gamma sectors.

In the modem constructed as above, which is applied to the base station of a conventional CDMA mobile communications system, each of modulators 1a to 1d in base station modulation section 1 modulates data to be transmitted for each sector (alpha, beta and gamma) into 9-bit parallel data in the form of 2's complement, to which I and Q signals are added. The modulated data of the four channels, which are output from the modem, becomes four pieces of sector data for each sector. The four pieces of sector data are selectively applied to first, second and third data combining sections 2, 3 and 4, processed therein, and transmitted through a transmitter (not shown).

The data combining sections are described below in detail. With first data combining section 2 having four channels, first to four signal separators 2a to 2d separate the I and Q signals from the alpha data of four channels, and first to four adders 2e to 2h add the separated I and Q signals in the unit of two I signals and two Q signals. The added I signals are added once again by a fifth adder 2i, and transmitted as 10-bit channel data to the transmitter. The added Q signals are added again in a sixth adder 2j, and transmitted as 10-bit Q-signal channel data to the transmitter.

The configuration and operation of second and third data combining sections 3 and 4 are identical to those of first data combining section 2, so that the explanation for the second and third data combining sections will be omitted. However, different from the first data combining section, the second data combining section processes the modulated beta data, and the third data combining section processes the modulated gamma data.

The above-described CSM of the conventional CDMA mobile communications system can be realized without a separate serial/parallel converter because the channel data output from each base station modulator in base station modulation unit 1 is 9-bit parallel data. However, the 9-bit parallel data has no parity bit for checking if there is data error, so that parity check is impossible. Thus, the reliability of data cannot be secured. Furthermore, one modulator and one digital adder are required for one channel in the conventional CSM. This means that the number of modulator and digital adder increases when the communications system needs a lot of channels. This complicates the configuration of the system.

To solve this problem, a CSM 5 shown in FIG. 2 has been developed. This modem is constructed in a manner that the plurality of modulators and adders of FIG. 1 are built in one chip. The output of the modem is 16-bit two bit streams of serial data where I and Q signals of the three sectors (alpha, beta and gamma) are separated from each another. This data consists of 15-bit serial data in 2's complement, and one parity bit.

While CSM 5 can reduce the size of the system, compared to the modem of FIG. 1, data communication is performed without detection and correction of error in the data which is outputted from the base station even though there is the parity bit for correcting the error of output data. Thus, reliability in data communications cannot be secured. In other words, even when error occurs in data output from the CSM, the data having error is transmitted to a mobile or control unit, resulting in malfunction of them.

SUMMARY OF THE INVENTION

Accordingly, the present invention is directed to a parity detecting checking device and method in a CDMA mobile communications system that substantially obviates one or more of the problems due to limitations and disadvantages of the related art.

An object of the present invention is to provide a parity detecting device in a CDMA mobile communications system, which detects parity bit in data outputted from a cell cite modem, to judge if there is data error, and, when data error occur, to control data output, to thereby improve the reliability in data communication.

Another object of the present invention is to provide a parity detecting method in a CDMA mobile communications systems, which detects parity bit in data outputted from a cell cite modem, to judge if there is data error, and, when data error occur, to control data output, to thereby improve the reliability in data communication.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To accomplish the object of the present invention, there is provided a parity detecting device in a CDMA mobile communications system communicating with other base station, terminal or control unit through a cell cite modem, the parity detecting device including: a serial/parallel converting section for converting serial data to be transmitted through the cell cite modem into parallel data; a parity detecting section for checking if there is a parity error in the parallel data converted by the serial/parallel converting section; an interrupt generation and parity state maintaining section for selectively generating an interrupt according to the parity error detection value detected by the parity detecting section, and maintaining the parity detection state; and an output controlling means for controlling the outputting of the parallel data from the serial/parallel converting section, according to the parity error detection value from the interrupt generation and parity state maintaining section.

The present invention also provides a parity detecting method in a CDMA mobile communications system communicating with other base station, terminal or control unit through a cell cite modem, the method comprising the steps of: converting serial data to be transmitted through the modem into parallel data; checking if there is a parity error in the parallel data; generating an interrupt when the parity error is detected, and maintaining the parity detection state; and controlling the output of the parallel data when the parity is detected.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 is a block diagram of output control section in FIG. 3;

FIGS. 6A to 6I are timing diagrams when there is no parity error, in the parity detecting device according to the present invention; and FIGS. 6A' to 6I' are timing diagrams when there is parity error, in the parity detecting device according to the present invention.

DETAILED DESCRIPTION OF PREFERRED EMBODIMENT

Reference will now be made in detail to the preferred embodiments of the present invention, examples of which are illustrated in the accompanying drawings.

Figure 1:
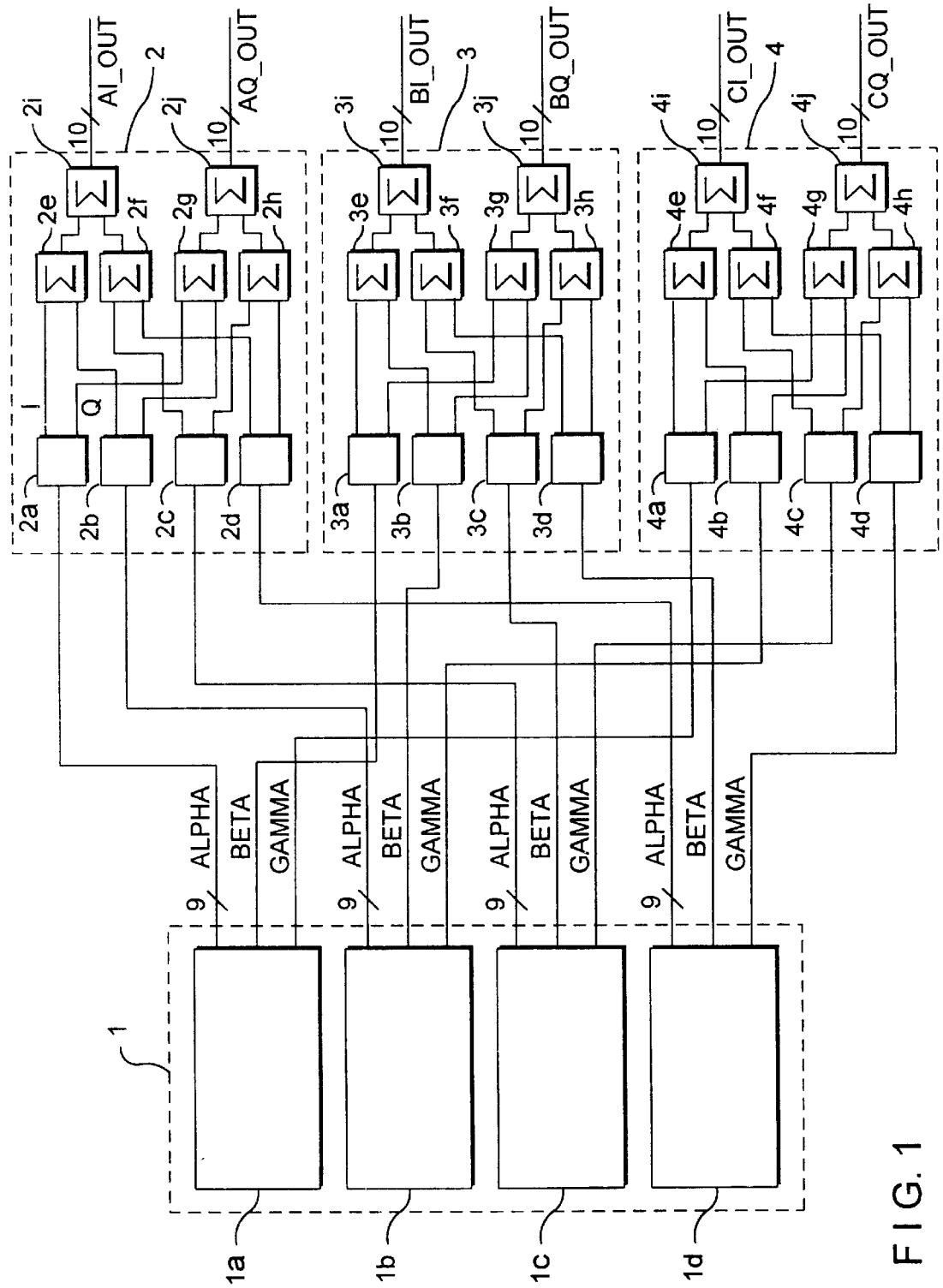
FIG. 1 shows the configuration of a cell cite modem of a conventional CDMA mobile communications system.
Figure 2:
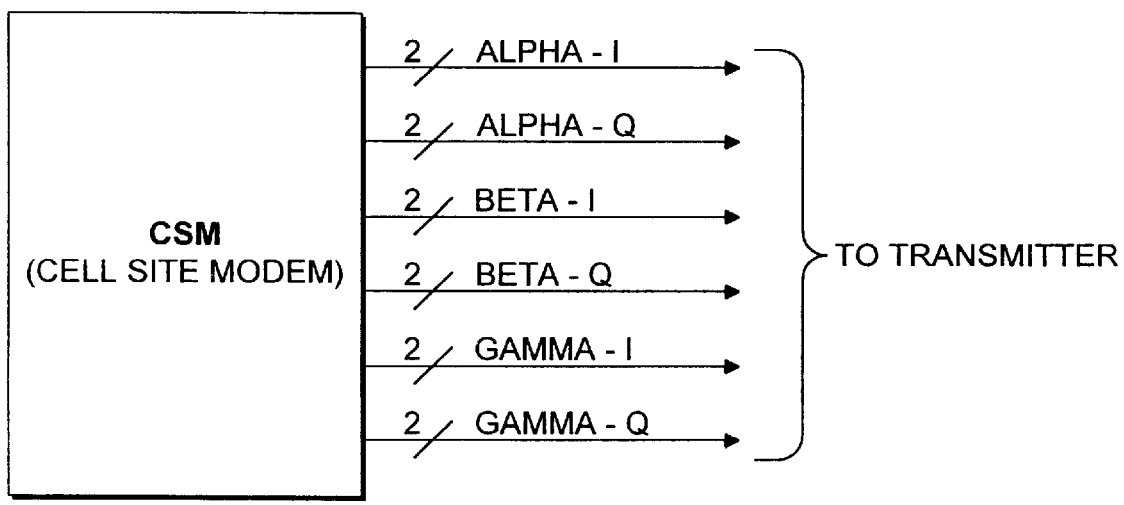
FIG. 2 shows another cell cite modem of a conventional CDMA mobile communications system.
Figure 3:
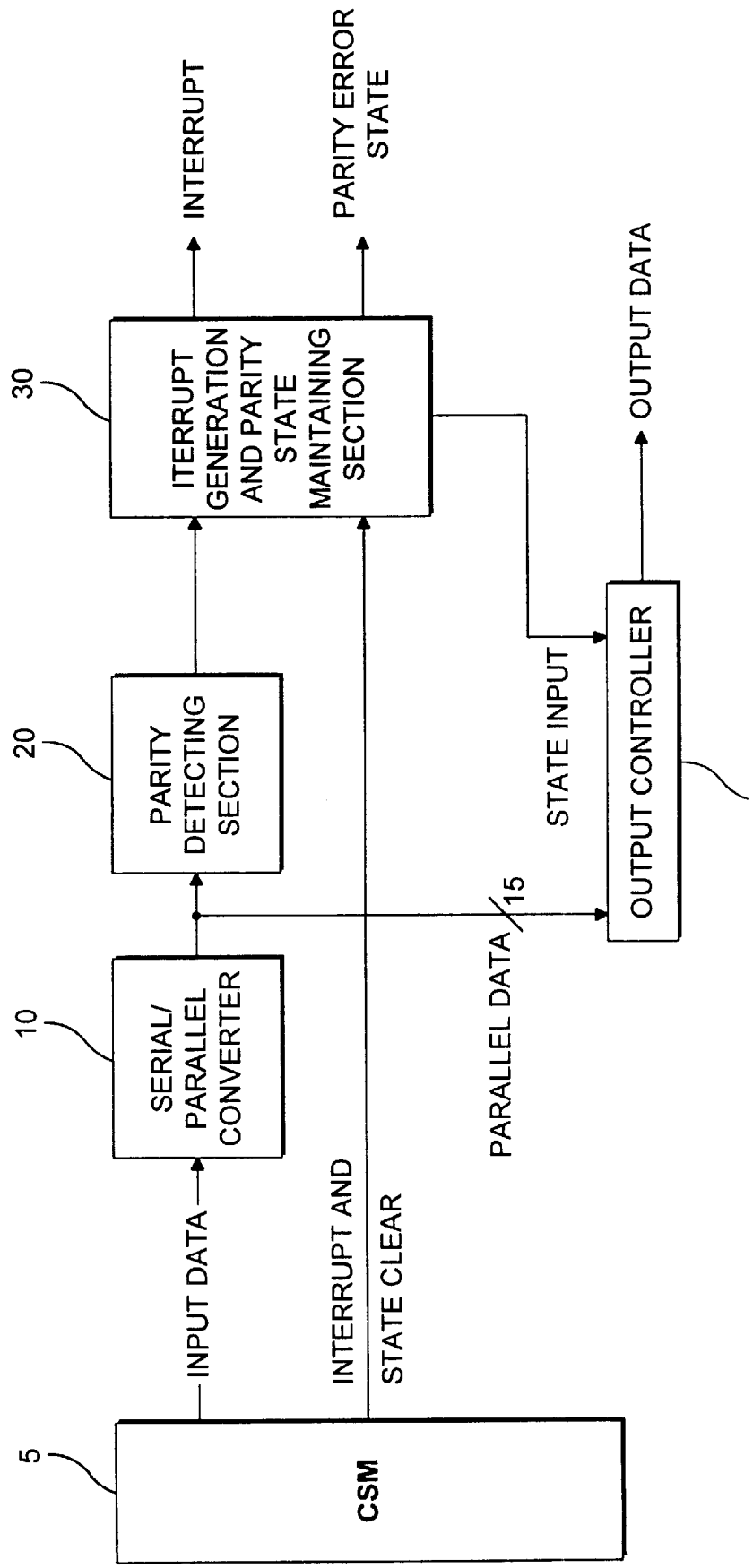
FIG. 3 is a block diagram of a parity detecting device in a CDMA mobile communications system according to the present invention.
Figure 4:
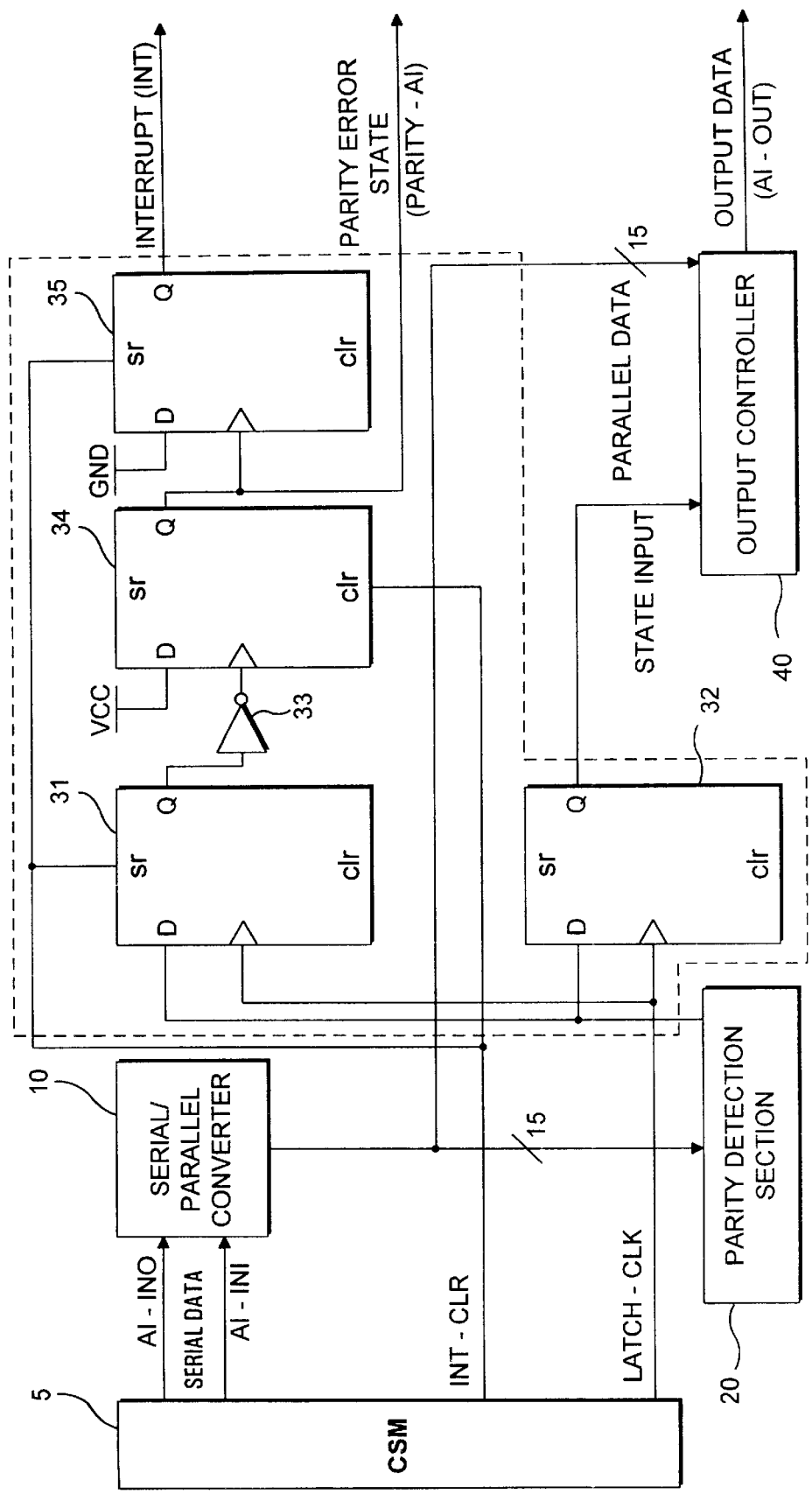
FIG. 4 shows the configuration of interrupt generation and parity state maintaining section in FIG. 3.

FIG. 3 is a block diagram of a parity detecting device in a CDMA mobile communications system according to the present invention. Referring to FIG. 3, the parity detecting device includes: a serial/parallel converter 10 for converting serial data to be transmitted, which is outputted from a cell cite modem, into parallel data; a parity detecting section 20 for checking if there is a parity bit in the parallel data; an interrupt generation and parity state maintaining section 30 for generating an interrupt signal according to the parity detection result of parity detecting section 20, and maintaining the parity detection result; and an output control section 40 for controlling the output data of serial/parallel converter 10 according to the parity detection result from interrupt generation and parity state maintaining section 30.

Interrupt generation and parity state maintaining section 30 includes: first and second flip-flops 31 and 32 for latching data about the parity detection result from parity detecting section 20 in synchronization with a latch clock; an inverter 33 for phase-shifting the data about parity detection result, latched by first flip-flop 31; a third flip-flop 34 for receiving the output signal of inverter 33 as a clock signal, latching an input data in synchronization with the clock signal, and outputting it as a parity error state value; and a fourth flip-flop 35 for receiving the parity error state value as a clock signal, latching a ground signal in synchronization with the clock signal, and outputting it as an interrupt signal.

Output control section 40 includes: a parity error judging section 41 for judging if there is a parity error, with the parity detection result from parity detecting section 20, and increasing the internal count value according to the judgement result; a comparing section 42 for comparing the count value obtained from parity error judging section 41 with a predetermined reference value, and generating a data selection signal according to the compared result; and a data selecting section 43 for selecting one of the parallel data, from serial/parallel converter 10, and ground signal data, according to the data selection signal outputted from comparing section 42.

The operation of the parity detection device according to the present invention is explained below with reference to FIGS. 3 to 6. The CSM of a CDMA mobile communications system has six channels, and the output of each channel consists of one parity bit and fifteen data bits in the form of 2's complement. To detect parity bit error of this serial data, while interrupt generation and parity state maintaining section 30 is initialized with a clear signal INT_CLR shown in FIG. 6F, serial/parallel converter 10 converts the serial data (FIGS. 6B and 6C) applied thereto into corresponding parallel data, and applies the parallel data to output control section 40 controlling data output, and parity detecting section 20 detecting a parity.

Parity detecting section 20 checks if there is a parity error in the parallel data, and transmits the detection value to interrupt generation and parity state maintaining section 30. First and second flip-flops 31 and 32 in interrupt generation and parity state maintaining section 30 latches the parity error detection value in synchronization with a latch clock LATCH_CLK shown in FIG. 6B. The latched data is phase-shifted by inverter 33, and applied to third flip-flop 34 as a clock signal. In synchronization with this clock, third flip-flop 34 latches data VCC applied to its data terminal D, and outputs a parity error state value PARITY_AI.

Fourth flip-flop 35 receives this parity error state value as a clock, and latches data applied to its data terminal D, in synchronization with the clock. This latched data becomes interrupt signal which is transmitted to a CPU (not shown) controlling the system. For example, if there is a parity error in input parallel data, parity detecting section 20 outputs "low" signal (0 V), and this signal is latched in first and second flip-flops 31 and 32 of interrupt generation and parity state maintaining section 30. The latched "low" signal is phase-shifted by inverter 33, to be converted into "high" signal. Thus, the input clock of third flip-flop 34 is changed from "low" state to "high" state, and the output signal Q of third flip-flop 34 is changed from "low" state to "high" state. This "high" signal is applied to the clock terminal of fourth flip-flop 35, and thus the output signal Q of fourth flip-flop 35 is converted from "low" state into "high" state, and generating interrupt signal INT.

When there is no parity error in the input parallel data, the output signal of parity detecting section 20 becomes "high" state, and first and second flip-flops 31 and 32 output "high" signals. Thus, inverter 33 outputs "low" signal, and the input clock of third flip-flop 34 is changed from "high" state to "low" state. Here, third flip-flop 34 maintains the previous output value because it operates at the positive edge. Accordingly, fourth flip-flop 35 also maintains the previous output value, so that the interrupt signal is not generated. Furthermore, the parity error state value becomes a parity error state value representing there is no parity error.

When a parity error occurs, to generate the interrupt signal, the CPU recognizes this interrupt, reads the parity error state value outputted from third flip-flop 34, and simultaneously, generates an interrupt clear signal as shown in FIG. 6F', to initialize interrupt generation and parity state maintaining section 30 again. FIGS. 6A to 6I are timing diagrams when the parity error is not generated, which show that input serial data AI_IN0 and AL_INI is converted into parallel data, and outputted as data AL_OUT[14..0], and interrupt is not generated. FIGS. 6A' to 6I' are timing diagrams when the parity error occurs, which show that interrupt signal shown in FIG. 6H' is generated as soon as the parity error occurs, and the CPU sends the interrupt clear command, to remove the interrupt.

Meanwhile, parity error judging section 41 of output control section 40 judges the parity error with the output value of second flip-flop 32 of interrupt generation and parity state maintaining section 30. When a parity error is detected, parity error judging section 41 sets the internal count value to "0", and judges if there is a parity error again. If the parity error continuously occurs, a signal for stopping data output, that is, a signal for selecting ground signal ("0"), is applied to data selecting section 43 as a selection signal, so that data selecting section 43 restrains outputting of parallel data, and outputs "0".

When the parity error does not occur, comparing section 42 compares the count value with the predetermined reference value of 55. Here, the count value is set to 55 in order to output "0" during the period of 56+8(64) clocks after the system returns to the normal state after the parity error occurs. From the comparison result, when the count value is smaller than 55, comparing section 43 increases one count value, and then performs the comparing operation again. when the count value is larger than 55, comparing section 42 sets the count value to 56, and outputs a selection signal to data selecting section 43. Then, data selecting section 43 selects and outputs the parallel data from serial/parallel converter 10, according to the selection signal.

In other words, when the parity is not detected by parity detecting section 20, the parallel data from by serial/parallel converter 10 is outputted without any change. On the other hand, when the parity error is detected, the parallel data is not outputted but restrained, thereby securing the reliability in data transmission.

While the output of CSM consists of ALPHA-I channel data, ALPHA-Q channel data, BETA-I channel data, BETA-Q channel data, GAMMA-I channel data and GAMMA-Q channel data, the configuration and operation for one of them are explained in the present invention. The configuration and operation for other channels are identical to the aforementioned one. That is, the present invention can be applied to the six channels. For this, the input clocks of fourth flip-flop 35 of interrupt generation and parity state maintaining section 30 are tied to one.

That is, the outputs of third flip-flop 34 are OR-gated, and the result value is applied to fourth flip-flop 35 as a clock, to thereby generate an interrupt signal. The CPU reads the parity error state value, to recognize a channel where the parity error occurs. When a parity error is generated, the operation is carried out as above-described.

As described above, the present invention checks the parity in the data transmitted from the CSM, and, when there is a parity error, does not output the data. By doing so, data having error is prevented from transmitting to other mobile or control unit. Accordingly, the reliability in data communication can be secured.

It will be apparent to those skilled in the art that various modifications and variations can be made in the parity detecting device and method in a CDMA mobile communications system of the present invention without departing from the spirit or scope of the invention. Thus, it is intended that the present invention cover the modifications and variations of this invention provided they come within the scope of the appended claims and their equivalents.

What is claimed is:

1. In a parity detecting device of a CDMA mobile communications system communicating with another base station, terminal or control unit through a cell cite modem, the parity detecting device which comprises:

serial/parallel converting means for converting serial data to be transmitted through the cell cite modem into parallel data;

parity detecting means for checking if there is a parity error in the parallel data converted by the serial/parallel converting means;

interrupt generation and parity state maintaining means for selectively generating an interrupt according to the parity error detection value detected by the parity detecting means, and maintaining the parity detection state; and output controlling means for controlling the outputting of the parallel data from the serial/parallel converting means, according to the parity error detection value from the interrupt generation and parity state maintaining means;

the parity detecting device being characterized by the interrupt generation and parity state maintaining means comprising:

first and second flip-flops for latching the parity error detection data obtained from the parity detecting means in synchronization with a latch clock;

an inverter for phase shifting the parity detection data outputted from the first flip-flop;

a third flip-flop for latching input data using the output signal of the inverter as a clock, and outputting it as a parity error state value; and a fourth flip-flop for latching a ground signal using the parity error state value outputted from the third flip-flop as a clock, and outputting it as an interrupt signal.

2. The parity detecting device as claimed in claim 1, wherein the output controlling means comprises:

a parity error judging section for judging if there is a parity error, with the parity detection value obtained from the parity detecting means, and increasing the internal count value according to the judgement result;

a comparing section for comparing the count value obtained from parity error judging section with a predetermined reference value, and generating a data selection signal according to the compared result;

and a data selecting section for selecting one of the parallel data, obtained from serial/parallel converting means, and ground signal data, according to the data selection signal outputted from comparing section.

3. The parity detecting device as claimed in claim 2, wherein the comparing section sets the reference value to 55, compares the increasing count value with the reference value, and generates a data selecting signal corresponding to the comparison result.

4. The parity detecting device as claimed in claim 2, wherein the data selecting section is configured of a 2:1 multiplexer which selects one of the parallel data and ground signal value, according to a selecting signal applied thereto.

* * * * *